US008108357B2

(12) United States Patent
Wang

(10) Patent No.: US 8,108,357 B2
(45) Date of Patent: Jan. 31, 2012

(54) SYSTEM AND METHOD TO RESTORE COMPUTER FILES

(75) Inventor: Hao Wang, Beijing (CN)

(73) Assignee: Computer Associates Think, Inc., Islandia, NY (US)

( * ) Notice: Subject to any disclaimer, the term of this patent is extended or adjusted under 35 U.S.C. 154(b) by 339 days.

(21) Appl. No.: 12/434,875

(22) Filed: May 4, 2009

(65) Prior Publication Data

US 2010/0281001 A1    Nov. 4, 2010

(51) Int. Cl.
G06F 17/30 (2006.01)
(52) U.S. Cl. ...................................................... 707/674
(58) Field of Classification Search .................. 707/204, 707/674; 711/113
See application file for complete search history.

(56) References Cited

U.S. PATENT DOCUMENTS

| 6,839,803 B1* | 1/2005 | Loh et al. ....................... 711/113 |
| 7,839,766 B1* | 11/2010 | Gardner ......................... 370/218 |
| 7,885,938 B1* | 2/2011 | Greene et al. ................. 707/674 |
| 2003/0182175 A1* | 9/2003 | Buie et al. ....................... 705/10 |
| 2008/0005198 A1* | 1/2008 | Cobb ............................ 707/204 |
| 2008/0288439 A1* | 11/2008 | Chandley et al. ................. 707/1 |

* cited by examiner

Primary Examiner — Etienne Leroux
(74) Attorney, Agent, or Firm — Schwegman, Lundberg & Woessner, P.A.

(57) ABSTRACT

A computerized process receives at a processor a request to restore a file to memory. One or more media types and one or more media residencies that are associated with a plurality of backups of the file are identified. Each of the media types and media residencies has a restore factor associated with it. A calculated restore factor is determined for each combination of media type and media residency using the restore factor of each media type and each media residency. A media type and a media residency are selected as a function of the calculated restore factor. The file is restored to memory using the selected media type and the selected media residency.

20 Claims, 3 Drawing Sheets

MEDIA TYPE:

| MEDIA TYPE | RESTORE FACTOR |
| --- | --- |
| 110 — FILE SYSTEM DEVICE | 16 |
| 120 — XOSOFT REPLICA | 8 |
| 130 — ONLINE TAPE MEDIA | 8 |
| 140 — OFFLINE TAPE MEDIA | 1 |

*Fig. 1*

MEDIA RESIDENCY:

| RESIDENCY | RESTORE FACTOR |
| --- | --- |
| 210 — SAN DEVICES | 16 |
| 220 — 1000M LAN | 16 |
| 230 — LOCAL DRIVE | 16 |
| 240 — LOCAL SCSI DEVICES | 8 |
| 250 — ISCSI | 8 |
| 260 — 100M LAN | 4 |
| 270 — WAN/REMOTE | 2 |

*Fig. 2*

SYSTEM AND METHOD TO RESTORE COMPUTER FILES

TECHNICAL FIELD

The present invention relates to a system and method to restore computer files from backups, and in an embodiment, but not by way of limitation, to systems and methods to restore computer files from backups that reside on multiple sources.

BACKGROUND

Backing up computer files and databases may be performed on multiple targets consisting of the same or different target media type and in association with different target media residencies. Examples of the different media types upon which a backup can be stored include file system devices such as disk drives, online tape media, and offline tape media. Examples of the different media residencies with which the different media types can be associated include storage area network (SAN) devices, local area network (LAN) devices, wide area network (WAN) devices, and small computer system interfaces (SCSI).

BRIEF DESCRIPTION OF THE DRAWINGS

FIG. 1 is a chart listing example restore factors that can be associated with different media types.

FIG. 2 is a chart listing example restore factors that can be associated with different media residencies.

SUMMARY

Figure 3:
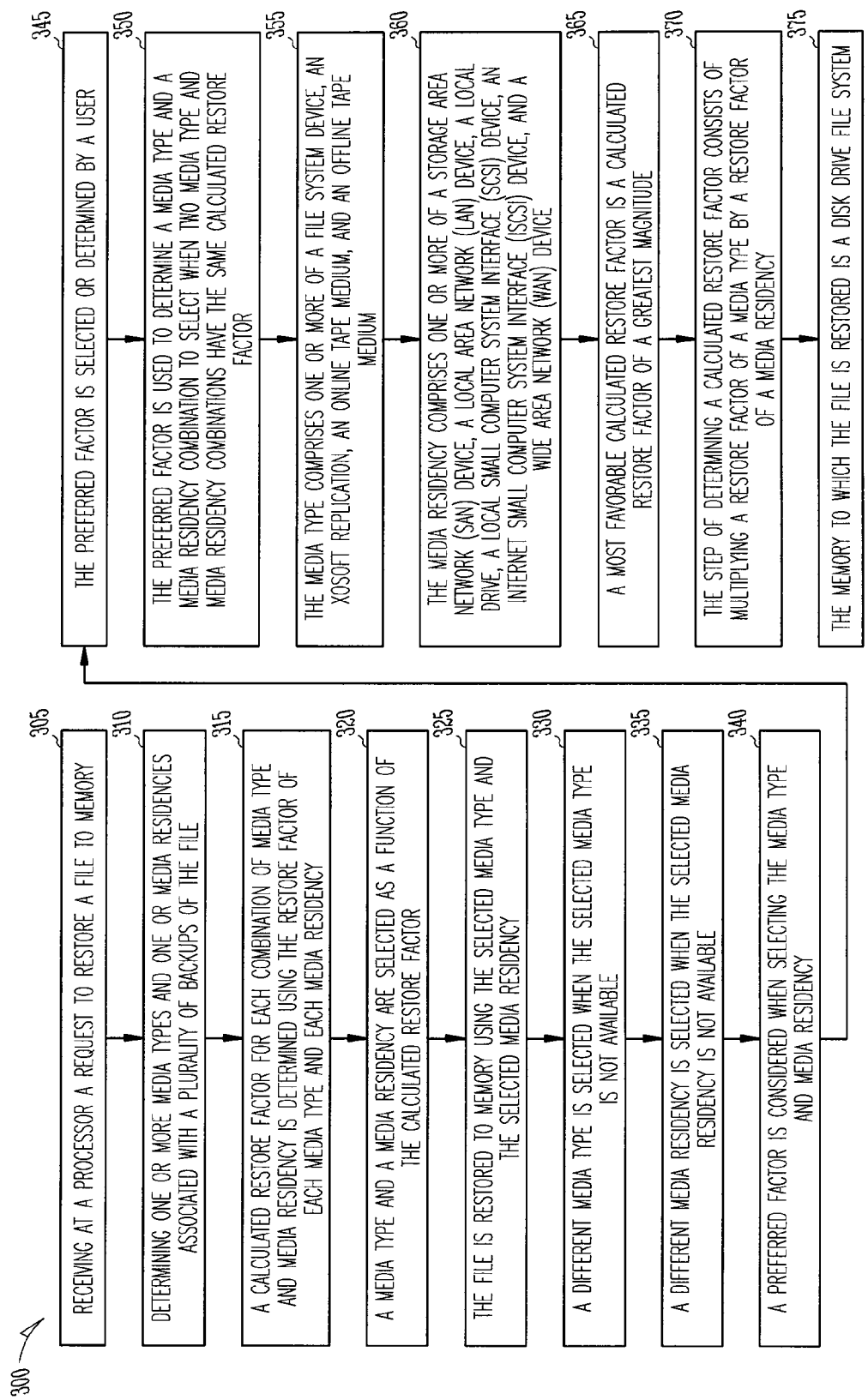
FIG. 3 illustrates a flowchart of an example embodiment of a process to restore a computer file that is backed up on multiple locations.

A computerized process receives at a processor a request to restore a file to memory. One or more media types and one or more media residencies that are associated with a plurality of backups of the file are identified. Each of the media types and media residencies has a restore factor associated with it. A calculated restore factor is determined for each combination of media type and media residency using the restore factor of each media type and each media residency. A media type and a media residency are selected as a function of the calculated restore factor. The file is restored to memory using the selected media type and the selected media residency.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Embodiments of the invention include features, methods or processes embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include digital/analog signal processing systems, software, data processing hardware, data processing system-implemented methods, and various processing operations, further described herein.

A number of figures show block diagrams of systems and apparatus of embodiments of the invention. A number of figures show flow diagrams illustrating systems and apparatus for such embodiments. The operations of the flow diagrams will be described with references to the systems/apparatuses shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

In many file backup situations, when a backup is made, the media to which the file is backed up includes two different factors—the media type and the media residency. The media type can consist of such things as file system devices, online tape media, and offline tape media. The media residency factor can include such things as storage area network (SAN) devices, local area network (LAN) devices, wide area network (WAN) devices, and small computer system (SCSI) interfaces. When restoring a file, the two factors of media type and media residency will affect the speed of the restore. An embodiment of the present disclosure determines the best, i.e. fastest, manner in which to restore/retrieve backed up data.

In an embodiment, when a user requests that a file be restored, the system will first determine all of the available media types and media residencies for the particular file to be restored. This can be determined by reading a database that lists all of the media types and media residencies in the system. The database can also include a restore factor associated with each media type and media residency in the system. Such restore factor is based on the speed and convenience of a particular media type or media residency. Media types and residencies that provide higher speed and greater convenience are assigned more favorable restore factors than media types and residencies that provide lower speeds and less convenience. The restore factors can be based on the known specifications for each media type and media residency.

Then, for each media type and media residency combination, the system determines a calculated restore factor. In an embodiment, the calculated restore factor is determined by multiplying the restore factor for a particular media type by the restore factor for a particular media residency. In other embodiments, other mathematical operations could be used to determine a calculated restore factor. Then, since the magnitude of the restore factor for a media type and media residency is proportional to the speed and convenience of a restore using that media type and media residency, the greater the calculated restore factor, the faster and more convenient the restore will be using that media type and media residency combination. Similarly, if there is an inverse relationship between the restore factor for a particular media type and media residency, then a smaller calculated restore factor will indicate the faster and more convenient restore media type and media residency combination.

For example, FIG. 1 illustrates a chart 100 that lists example restore factors associated with the media types of a file system device 110, an XOSoft™ replication 120, online tape media 130, and offline tape media 140. Similarly, FIG. 2 illustrates a chart 200 that lists example restore factors associated with the media residencies of a SAN device 210 (including fiber channel interfaces), a 1000M LAN 220, a local drive 230, a local SCSI devices 240, an iSCSI 250, a 100M LAN 260, and a WAN/remote 270.

Referring to FIGS. 1 and 2, if a file to be restored can be found on a SAN tape device and online tape media, and on a 100M LAN and a file system device, the calculated restore factor can be determined as follows. The restore values for the SAN device 210 and online tape media 130 are 16 and 8 respectively, the product of which is 128. By comparison, the product of the files system device 110, whose restore value is 16, and the 100M LAN 260, whose restore value is 4, is 64. Since the values of the restore factors in FIGS. 1 and 2 are proportional to the speed and convenience of the restore, the larger calculated restore factor is chosen here—the SAN tape device.

In an embodiment, the system can take into account a preferred factor. This preferred factor can be chosen by a user. The preferred factor can indicate a combination of media type and media residency that is preferred by the system, the system administrator, or the user. The preferred factor can then be taken into account when two or more media types and media residencies have the same calculated restore factor. It can also be used to choose a media type and media residency with a lower calculated restore factor than another media type and media residency combination. The preferred factor can even be used to override all other media types and media residencies, regardless of the calculated restore factors, if the situation so warrants.

FIG. 3 is a flowchart of an example process 300 for restoring a computer file from backup files that are resident on multiple sources and/or locations. FIG. 3 includes a number of process blocks 305-375 that are identified by unique numbers. Though arranged serially in the example of FIG. 3, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now to FIG. 3, the computerized process 300 includes at 305, receiving at a processor a request to restore a file to memory. At 310, one or more media types and one or more media residencies that are associated with a plurality of backups of the file are identified. Each of the media types and media residencies has a restore factor associated with it. At 315, a calculated restore factor for each combination of media type and media residency is determined using the restore factor of each media type and each media residency. At 320, a media type and a media residency are selected as a function of the calculated restore factor. At 325, the file is restored to memory using the selected media type and the selected media residency.

Continuing with the process 300 of FIG. 3, at 330, a different media type is selected when the selected media type is not available, and at 335, a different media residency is selected when the selected media residency is not available. If the most favorable combination is not available, the second most favorable will be tried. If the second most favorable combination is not available, then the third most favorable combination will be tried, and so on, and so forth, until all possible combinations are tried. In some instances, it will not be known that a combination is not available until the restore is attempted. In such instances, the next most favorable combination is attempted after the attempted restore. At 340, a preferred factor is considered when selecting the media type and media residency. At 345, the preferred factor is selected or determined by a user. At 350, the preferred factor is used to determine a media type and a media residency combination that should be selected when two media type and media residency combinations have the same calculated restore factor. At 355, the media type comprises one or more of a file system device, an XOSoft™ replication, an online tape medium, and an offline tape medium. At 360, the media residency comprises one or more of a storage area network (SAN) device, a local area network (LAN) device, a local drive, a local small computer system interface (SCSI) device, an internet small computer system interface (iSCSI) device, and a wide area network (WAN) device. At 365, a most favorable calculated restore factor is a calculated restore factor of a greatest magnitude. At 370, the step of determining a calculated restore factor consists of multiplying a restore factor of a media type by a restore factor of a media residency. At 375, the memory to which the file is restored is a disk drive file system.

Figure 4:
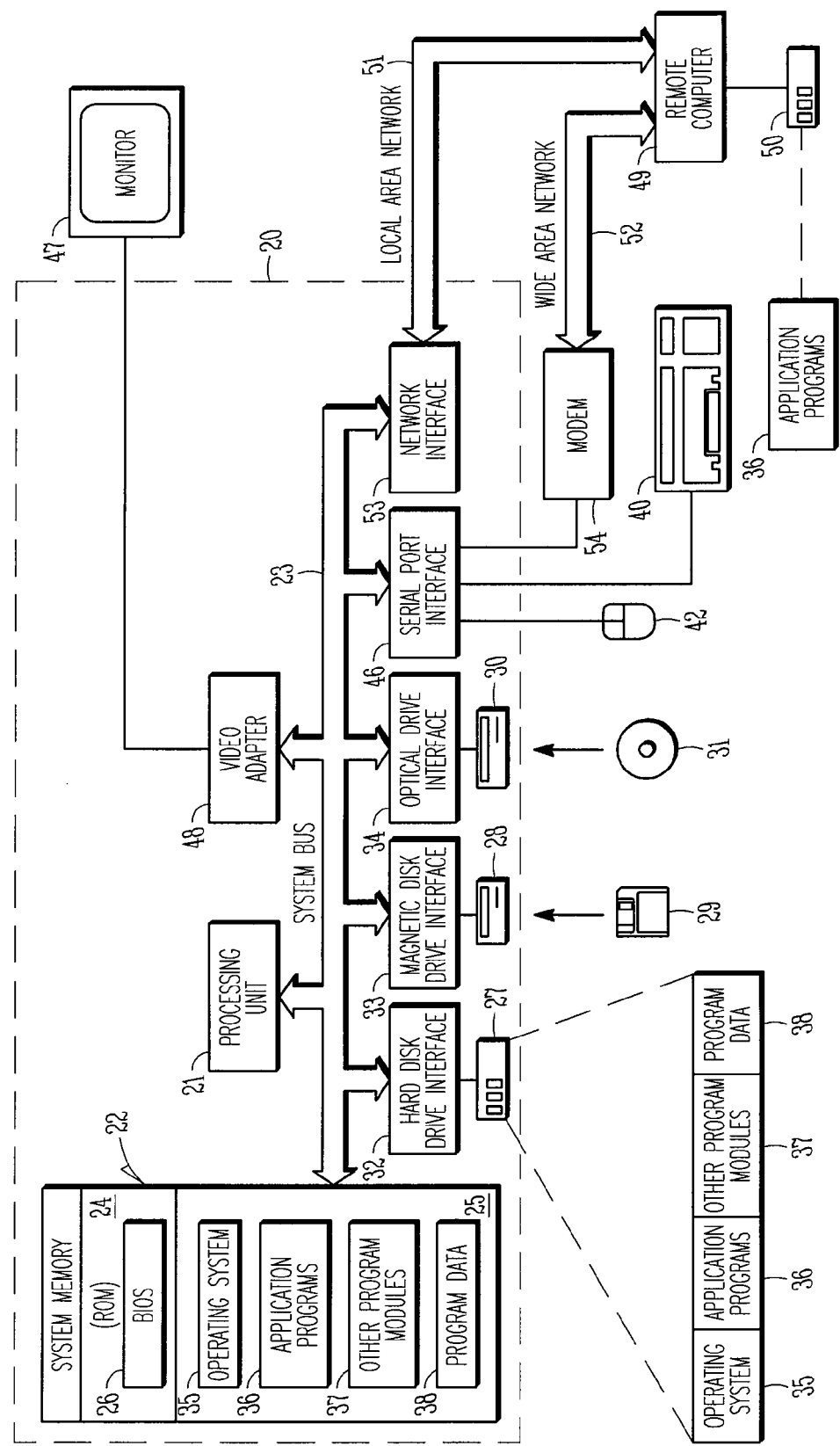
FIG. 4 illustrates a block diagram of an example embodiment of a computer system upon which embodiments of the present disclosure can operate.

FIG. 4 is an overview diagram of a hardware and operating environment in conjunction with which embodiments of the invention may be practiced. The description of FIG. 4 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 4, a hardware and operating environment is provided that is applicable to any of the servers and/or remote clients shown in the other Figures.

As shown in FIG. 4, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 5 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

The invention claimed is:

1. A computerized process comprising:
   receiving at a processor a request to restore a file to a memory device;
   determining one or more media types and one or more media residencies associated with a plurality of backups of the file, each of the media types and media residencies having a numerical restore factor associated with it;

determining a calculated restore factor for each combination of media type and media residency using the restore factor of each media type and each media residency, wherein determining the calculated restore factor comprises performing a mathematical operation using a numerical restore factor of a media type and a numerical restore factor of a media residency;

selecting a media type and a media residency as a function of the calculated restore factor; and restoring the file to the memory device using the selected media type and the selected media residency.

2. The computerized process of claim 1, comprising selecting a different media type when the selected media type is not available.

3. The computerized process of claim 1, comprising selecting a different media residency when the selected media residency is not available.

4. The computerized process of claim 1, comprising considering a preferred factor in selecting the media type and media residency.

5. The computerized process of claim 4, wherein the preferred factor is determined by a user.

6. The computerized process of claim 4, wherein the preferred factor is used to determine a media type and a media residency combination to select when two media type and media residency combinations have the same calculated restore factor.

7. The computerized process of claim 1, wherein the media type comprises one or more of a file system device, an XOsoft™ replication, an online tape medium, and an offline tape medium.

8. The computerized process of claim 1, wherein the media residency comprises one or more of a storage area network (SAN) device, a local area network (LAN) device, a local drive, a local small computer system interface (SCSI) device, an internet small computer system interface (iSCSI) device, and a wide area network (WAN) device.

9. The computerized process of claim 1, wherein a most favorable calculated restore factor comprises a calculated restore factor of a greatest magnitude.

10. The computerized process of claim 1, wherein the determining a calculated restore factor comprises multiplying a restore factor of a media type by a restore factor of a media residency.

11. The computerized process of claim 1, wherein the memory device comprises a disk drive file system coupled to the processor.

12. The computerized process of claim 1, wherein the restore factor is determined as a function of a speed and a convenience of the media type or the media residency.

13. A system comprising a processor, the processor configured to:
receive a request to restore a file to a memory device;
determine one or more media types and one or more media residencies associated with a plurality of backups of the file, each of the media types and media residencies having a numerical restore factor associated with it;
determine a calculated restore factor for each combination of media type and media residency using the restore factor of each media type and each media residency, wherein determining the calculated restore factor comprises performing a mathematical operation using a numerical restore factor of a media type and a numerical restore factor of a media residency;
select a media type and a media residency as a function of the calculated restore factor; and
restore the file to the memory device using the selected media type and the selected media residency.

14. The system of claim 13, wherein the processor is configured to select a different media type when the selected media type is not available or a different media residency when the selected media residency is not available.

15. The system of claim 13, wherein the processor is configured to consider a preferred factor in selecting the media type and media residency.

16. The system of claim 13, wherein the processor is configured to determine a calculated restore factor comprising multiplying a restore factor of a media type by a restore factor of a media residency.

17. A computer readable medium comprising instructions that when executed by a processor execute a process comprising:
receiving a request to restore a file to a memory device;
determining one or more media types and one or more media residencies associated with a plurality of backups of the file, each of the media types and media residencies having a numerical restore factor associated with it;
determining a calculated restore factor for each combination of media type and media residency using the restore factor of each media type and each media residency, wherein determining the calculated restore factor comprises performing a mathematical operation using a numerical restore factor of a media type and a numerical restore factor of a media residency;
selecting a media type and a media residency as a function of the calculated restore factor; and
restoring the file to the memory device using the selected media type and the selected media residency.

18. The computer readable medium of claim 17, comprising instructions for selecting a different media type when the selected media type is not available or a different media residency when the selected media residency is not available.

19. The computer readable medium of claim 17, comprising instructions for considering a preferred factor in selecting the media type and media residency.

20. The computer readable medium of claim 17, comprising instructions for determining a calculated restore factor comprising multiplying a restore factor of a media type by a restore factor of a media residency.

* * * * *